United States Patent
Nakamura

(10) Patent No.: US 12,539,951 B2
(45) Date of Patent: Feb. 3, 2026

(54) JET PROPULSION WATERCRAFT

(71) Applicant: YAMAHA HATSUDOKI KABUSHIKI KAISHA, Iwata (JP)

(72) Inventor: Mitsuyoshi Nakamura, Shizuoka (JP)

(73) Assignee: YAMAHA HATSUDOKI KABUSHIKI KAISHA, Shizuoka (JP)

(*) Notice: Subject to any disclaimer, the term of this patent is extended or adjusted under 35 U.S.C. 154(b) by 475 days.

(21) Appl. No.: 18/100,584

(22) Filed: Jan. 24, 2023

(65) Prior Publication Data

US 2023/0242227 A1    Aug. 3, 2023

(30) Foreign Application Priority Data

Feb. 2, 2022  (JP) ................. 2022-014741

(51) Int. Cl.
  *B63H 11/08*   (2006.01)
  *B63H 11/04*   (2006.01)
  *F02D 11/10*   (2006.01)
  *F02D 35/02*   (2006.01)

(52) U.S. Cl.
  CPC ............ *B63H 11/08* (2013.01); *F02D 11/107* (2013.01); *F02D 35/027* (2013.01); *B63H 2011/046* (2013.01); *F02D 2250/26* (2013.01); *F02D 2250/28* (2013.01)

(58) Field of Classification Search
  CPC ....... B63H 11/08; B63B 79/10; F02D 11/107; F02D 2250/28
  See application file for complete search history.

(56) References Cited

U.S. PATENT DOCUMENTS

| 2001/0049579 | A1  | 12/2001 | Fujino et al. |
| 2003/0082965 | A1* | 5/2003  | Uraki ............ B63B 34/10 440/38 |
| 2009/0117790 | A1* | 5/2009  | Makita .......... B63H 11/08 416/223 R |

FOREIGN PATENT DOCUMENTS

ES       2615809 A1 *  6/2017    ............ B63B 71/00

* cited by examiner

*Primary Examiner* — Andrew Polay
(74) *Attorney, Agent, or Firm* — Keating & Bennett, LLP

(57) ABSTRACT

A jet propulsion watercraft includes a watercraft body, a drive source in the watercraft body, a jet pump to suck and eject water with a drive force from the drive source to generate a propulsive force, a vibration sensor, and a controller. The vibration sensor is located in the jet pump to detect vibration of the jet pump. The controller is configured or programmed to determine whether or not a detection result from the vibration sensor meets a predetermined condition. The controller is configured or programmed to, when it is determined that the detection result from the vibration sensor meets the predetermined condition, inform a user of user-oriented information.

9 Claims, 5 Drawing Sheets

JET PROPULSION WATERCRAFT

CROSS REFERENCE TO RELATED APPLICATIONS

This application claims the benefit of priority to Japanese Patent Application No. 2022-014741 filed on Feb. 2, 2022. The entire contents of this application are hereby incorporated herein by reference.

BACKGROUND OF THE INVENTION

1. Field of the Invention

The present invention relates to a jet propulsion watercraft.

2. Description of the Related Art

US 2001/0049579A1 discloses a water jet propulsion watercraft as an example of a jet propulsion watercraft. The water jet propulsion watercraft includes an engine as an example of a drive source and a jet propulsion apparatus as an example of a jet pump. The jet propulsion apparatus includes an impeller shaft coupled to the crankshaft of the engine, an impeller mounted on the impeller shaft, an impeller housing that houses the impeller, and a jet nozzle mounted to a rear end portion of the impeller housing. When the jet propulsion apparatus is driven by the engine, the impeller generates a jet flow. Ejection of the jet flow through the jet nozzle causes a propulsive force to be generated.

The water jet propulsion watercraft includes various sensors to detect operating condition data such as engine rotation speed, throttle opening degree, cooling water temperature, and cooling water pressure, which indicate the operating condition of the engine, and an ECU configured or programmed to record operating condition data detected every predetermined sampling cycle. The operating condition data recorded in the ECU is output from the water jet propulsion watercraft to an external diagnosis support system for use in diagnosing, for example, the wear condition of the impeller of the jet propulsion apparatus in the diagnosis support system.

SUMMARY OF THE INVENTION

The inventor of preferred embodiments of the present invention described and claimed in the present application conducted an extensive study and research regarding jet propulsion watercrafts, such as the one described above, and in doing so, discovered and first recognized new unique challenges and previously unrecognized possibilities for improvements as described in greater detail below.

When the condition of the jet pump is determined by the external diagnosis support system based on the operating condition data of the drive source of the water jet propulsion watercraft, as in US 2001/0049579A1, it takes time and effort to, for example, send and receive the operating condition data and to verify the relationship between the operating condition data and the jet pump conditions.

Preferred embodiments of the present invention provide jet propulsion watercraft that each require reduced time and effort to determine jet pump conditions.

In order to overcome the previously unrecognized and unsolved challenges described above, a preferred embodiment of the present invention provides a jet propulsion watercraft including a watercraft body, a drive source in the watercraft body, a jet pump to suck in and eject water with a drive force from the drive source to generate a propulsive force, a vibration sensor, and a controller. The vibration sensor is in the jet pump to detect vibration of the jet pump. The controller is configured or programmed to determine whether or not a detection result from the vibration sensor meets a predetermined condition. The controller is configured or programmed to, when it is determined that the detection result from the vibration sensor meets the predetermined condition, inform a user of user-oriented information.

With this structural arrangement, in the jet propulsion watercraft, the controller is configured or programmed to determine whether or not a detection result from the vibration sensor, which is provided in the jet pump to detect vibration of the jet pump, meets a predetermined condition. That is, even without using, for example, an external diagnosis support system to analyze information indicating the operating condition of the drive source, the jet propulsion watercraft itself is able to determine the condition of the jet pump based on vibration of the jet pump itself, which is a detection result from the vibration sensor. This reduces the time and effort required to determine the condition of the jet pump. Further, when the detection result from the vibration sensor meets the predetermined condition, that is, the jet pump is in a predetermined condition, the controller informs of the user-oriented information and the user receiving the information is able to take an appropriate action to, for example, change the condition of the jet pump.

In a preferred embodiment of the present invention, the jet propulsion watercraft may further include a display, and the controller may be configured or programmed to, when it is determined that the detection result from the vibration sensor meets the predetermined condition, display and inform a user of the user-oriented information on the display.

In a preferred embodiment of the present invention, the jet propulsion watercraft may further include a buzzer, and the controller may be configured or programmed to, when it is determined that the detection result from the vibration sensor meets the predetermined condition, sound the buzzer to inform a user of the user-oriented information.

In a preferred embodiment of the present invention, the controller is configured or programmed to, when it is determined that the detection result from the vibration sensor meets the predetermined condition, limit an output of the drive source.

With this arrangement, when the detection result from the vibration sensor meets the predetermined condition, for example, when the jet pump is in a condition that needs to be improved, the output of the drive source is limited and thus the load on the jet pump is reduced, so that it is possible to reduce deterioration in the condition of the jet pump.

In a preferred embodiment of the present invention, the controller may be configured or programmed to, when it is determined that the detection result from the vibration sensor meets the predetermined condition, limit a rotation speed of the drive source to limit the output of the drive source.

In a preferred embodiment of the present invention, the controller may be configured or programmed to, when it is determined that the detection result from the vibration sensor meets the predetermined condition, stop the drive source to limit the output of the drive source.

In a preferred embodiment of the present invention, the controller may be configured or programmed to, when a vibration frequency of the jet pump detected by the vibration sensor remains equal to or higher than a predetermined value for a predetermined time, determine that the detection result from the vibration sensor meets the predetermined condition.

In a preferred embodiment of the present invention, the vibration sensor may be provided in a portion of the jet pump outside the watercraft body.

In a preferred embodiment of the present invention, the jet pump includes a drive shaft, an impeller, and an impeller housing. The drive shaft includes an inner shaft inside the watercraft body and an outer shaft outside the watercraft body to rotate integrally with the inner shaft, the drive shaft being operable to rotate when a drive force from the drive source is transmitted to the drive shaft. The impeller is mounted on the outer shaft to rotate integrally with the outer shaft. The impeller housing is fixed on the outer side of the watercraft body to house the impeller and to receive water sucked in when the impeller rotates. The vibration sensor is provided on the impeller housing.

With this structural arrangement, the controller of the jet propulsion watercraft is configured or programmed to determine whether or not there is foreign matter in the gap between the impeller and impeller housing in the jet pump based on the detection result from the vibration sensor provided on the impeller housing.

In a preferred embodiment of the present invention, the jet pump includes a drive shaft, an impeller, an impeller housing, an outer bearing, a duct, and a stator vane. The drive shaft includes an inner shaft inside the watercraft body and an outer shaft outside the watercraft body to rotate integrally with the inner shaft, the drive shaft being operable to rotate when a drive force from the drive source is transmitted to the drive shaft. The impeller is mounted on the outer shaft to rotate integrally with the outer shaft. The impeller housing is fixed on the outer side of the watercraft body to house the impeller and to receive water sucked in when the impeller rotates. The outer bearing supports the outer shaft. The duct is outside of and farther from the watercraft body than the impeller housing to support the outer bearing, the duct being operable to receive water flowing through the impeller housing. The stator vane is located within the duct to regulate the flow of water within the duct. The vibration sensor is provided on the duct.

With this structural arrangement, the controller of the jet propulsion watercraft is configured or programmed to determine the condition of, for example, the outer bearing supported on the duct based on the detection result from the vibration sensor provided on the duct.

In a preferred embodiment of the present invention, the jet pump includes a drive shaft, an impeller, an impeller housing, an outer bearing, a duct, a stator vane, and a nozzle. The drive shaft includes an inner shaft inside the watercraft body and an outer shaft outside the watercraft body to rotate integrally with the inner shaft, the drive shaft being operable to rotate when a drive force from the drive source is transmitted to the drive shaft. The impeller is mounted on the outer shaft to rotate integrally with the outer shaft. The impeller housing is fixed on the outer side of the watercraft body to house the impeller and to receive water sucked in when the impeller rotates. The outer bearing supports the outer shaft. The duct is outside of and farther from the watercraft body than the impeller housing to support the outer bearing, the duct being positioned to receive water flowing through the impeller housing. The stator vane is located within the duct to regulate the flow of water within the duct. The nozzle is located outside and farther from the watercraft body than the duct. The nozzle includes an ejection port. The nozzle is operable to eject water flowing through the duct from the ejection port. The vibration sensor is provided on the nozzle.

With this structural arrangement, the controller of the jet propulsion watercraft is configured or programmed to determine, for example, whether or not there is foreign matter within the nozzle based on the detection result from the vibration sensor provided on the nozzle. Also, the nozzle is farther from the watercraft body than the impeller housing and the duct in the jet pump, and thus may cause relatively large vibration. Therefore, the vibration sensor provided on the nozzle is able to accurately detect the vibration of the entire jet pump.

In a preferred embodiment of the present invention, the vibration sensor may be provided in a portion of the jet pump inside the watercraft body.

In a preferred embodiment of the present invention, the jet pump includes a drive shaft and a housing bearing. The drive shaft includes an inner shaft inside the watercraft body and an outer shaft outside the watercraft body to rotate integrally with the inner shaft, the drive shaft being operable to rotate when a drive force from the drive source is transmitted to the drive shaft. The housing bearing includes an inner bearing supporting the inner shaft, a holder supporting the inner bearing, and a damper elastically supporting the holder, the housing bearing being located inside the watercraft body. The vibration sensor is provided on the inner bearing or the holder.

With this structural arrangement, the controller of the jet propulsion watercraft is configured or programmed to determine the condition of, for example, the inner shaft supported on the inner bearing in the housing bearing based on the detection result from the vibration sensor provided on the inner bearing or the holder.

A preferred embodiment of the present invention provides a jet propulsion watercraft including a watercraft body, a drive source in the watercraft body, a jet pump to suck in and eject water with a drive force from the drive source to generate a propulsive force, and a vibration sensor. The vibration sensor is provided in the jet pump to detect vibration of the jet pump.

With this arrangement, even without analyzing information indicating the operating condition of the drive source, it is possible to determine the condition of the jet pump based on vibration of the jet pump itself, which is a detection result from the vibration sensor. This reduces the time and effort required to determine the condition of the jet pump.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
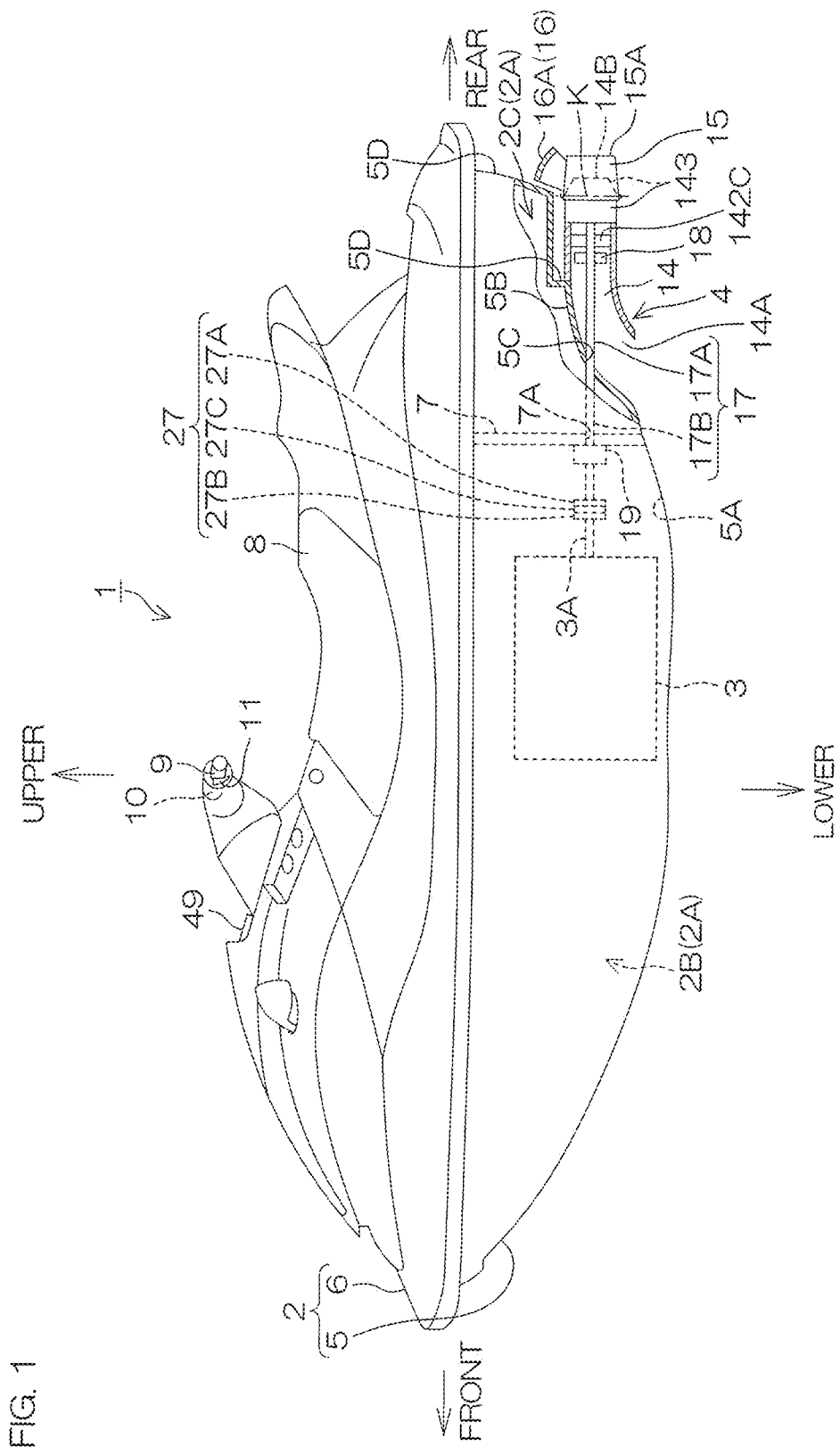
FIG. 1 is a schematic side view of a jet propulsion watercraft according to a preferred embodiment of the present invention.

FIG. 1 is a schematic left side view of a jet propulsion watercraft 1 according to a preferred embodiment of the present invention. The left-right direction in FIG. 1 corresponds to the front-rear direction of the jet propulsion watercraft 1. The left side in FIG. 1 corresponds to the front side of the jet propulsion watercraft 1. The right side in FIG. 1 corresponds to the rear side of the jet propulsion watercraft 1. In the following description, the left-right direction of the jet propulsion watercraft 1 is defined with reference to the direction forward of the jet propulsion watercraft 1. That is, the orthogonal direction out of the page of FIG. 1 corresponds to the leftward of the jet propulsion watercraft 1, while the orthogonal direction into the page of FIG. 1 corresponds to the rightward of the jet propulsion watercraft 1.

An example of the jet propulsion watercraft 1 is a small watercraft called a personal watercraft (PWC). The jet propulsion watercraft 1 includes a watercraft body 2 configured in an approximately symmetrical manner in the left-right direction, a drive source 3 located in the watercraft body 2, and a jet pump 4 located posterior to the drive source 3 to generate a propulsive force.

The watercraft body 2 is elongated in the front-rear direction, including a hull 5 that defines a watercraft bottom and a deck 6 located over the hull 5. The hull 5 has a U-shaped or V-shaped cross-section when cut in a vertical plane orthogonal to the front-rear direction of jet propulsion watercraft 1. Accordingly, the majority of an inner surface 5A of the hull 5 is U-shaped or V-shaped when viewed in the front-rear direction, and the hull 5 has a concave space demarcated by the inner surface 5A. An inclined wall 5B inclined upward toward the rear is provided at a rear end portion of the hull 5. The inclined wall 5B includes a through hole 5C that penetrates the inclined wall 5B in the front-rear direction. The portion of the hull 5 posterior to the inclined wall 5B is a transom 5D.

The deck 6 closes the concave space in the hull 5 from above. This causes the watercraft body 2 to have an internal space 2A demarcated between the hull 5 and the deck 6 in the vertical direction. The internal space 2A is elongated in the front-rear direction. A portion of the internal space 2A includes the concave space in the hull 5.

The watercraft body 2 includes a partition wall 7 located in the internal space 2A, and a seat 8 and a steering handle 9 aligned in the front-rear direction in an upper portion of the watercraft body 2.

The partition wall 7 includes a vertical plate extending in the left-right direction and is fixed at, for example, a rearward position in the internal space 2A of the watercraft body 2. The partition wall 7 is located anterior to the inclined wall 5B of the hull 5. The lower edge of the partition wall 7 has a U-shape or a V-shape when viewed in the front-rear direction to fit to the inner surface 5A of the hull 5. The internal space 2A is partitioned by the partition wall 7 into a front region 2B anterior to the partition wall 7 and a rear region 2C posterior to the partition wall 7. The partition wall 7 includes an insertion hole 7A that penetrates the partition wall 7 in the front-rear direction.

The seat 8 is located in a central portion of the deck 6. One or more occupants, who are users of the jet propulsion watercraft 1, can sit on the seat 8.

The steering handle 9 is located at a position where an occupant in the seat 8 can reach with his/her hands outstretched forward. An accelerator lever 10 to be operated by the occupant to change the magnitude of the propulsive force of the jet pump 4 is provided at a right end portion of the steering handle 9. A reverse lever 11 to be operated by the occupant for the jet pump 4 to generate a propulsive force for reverse drive of the jet propulsion watercraft 1 is provided at a left end portion of the steering handle 9.

The drive source 3 is located in the front region 2B of the internal space 2A. In this preferred embodiment, the drive source 3 is an engine, that is, an internal combustion engine, including a crankshaft 3A arranged to rotate about a rotation axis extending in the front-rear direction (see FIG. 2), but may be an electric motor. The drive source 3 outputs a drive force that is adjusted by the occupant operating the accelerator lever 10.

The jet pump 4 uses the drive force from the drive source 3 to suck in water through the watercraft bottom and eject water out of the watercraft body 2 to generate a propulsive force to propel the jet propulsion watercraft 1. Particularly, the jet pump 4 further includes a cylindrical flow path 14 extending rearward from the inclined wall 5B of the hull 5, and a deflector 15 and a reverse gate 16 supported on the flow path 14. The jet pump 4 further includes a drive shaft 17 to transmit the drive force from the drive source 3 to the jet pump 4, an impeller 18 mounted on the drive shaft 17, and a housing bearing 19 located inside the watercraft body 2 to support the drive shaft 17.

Figure 2:
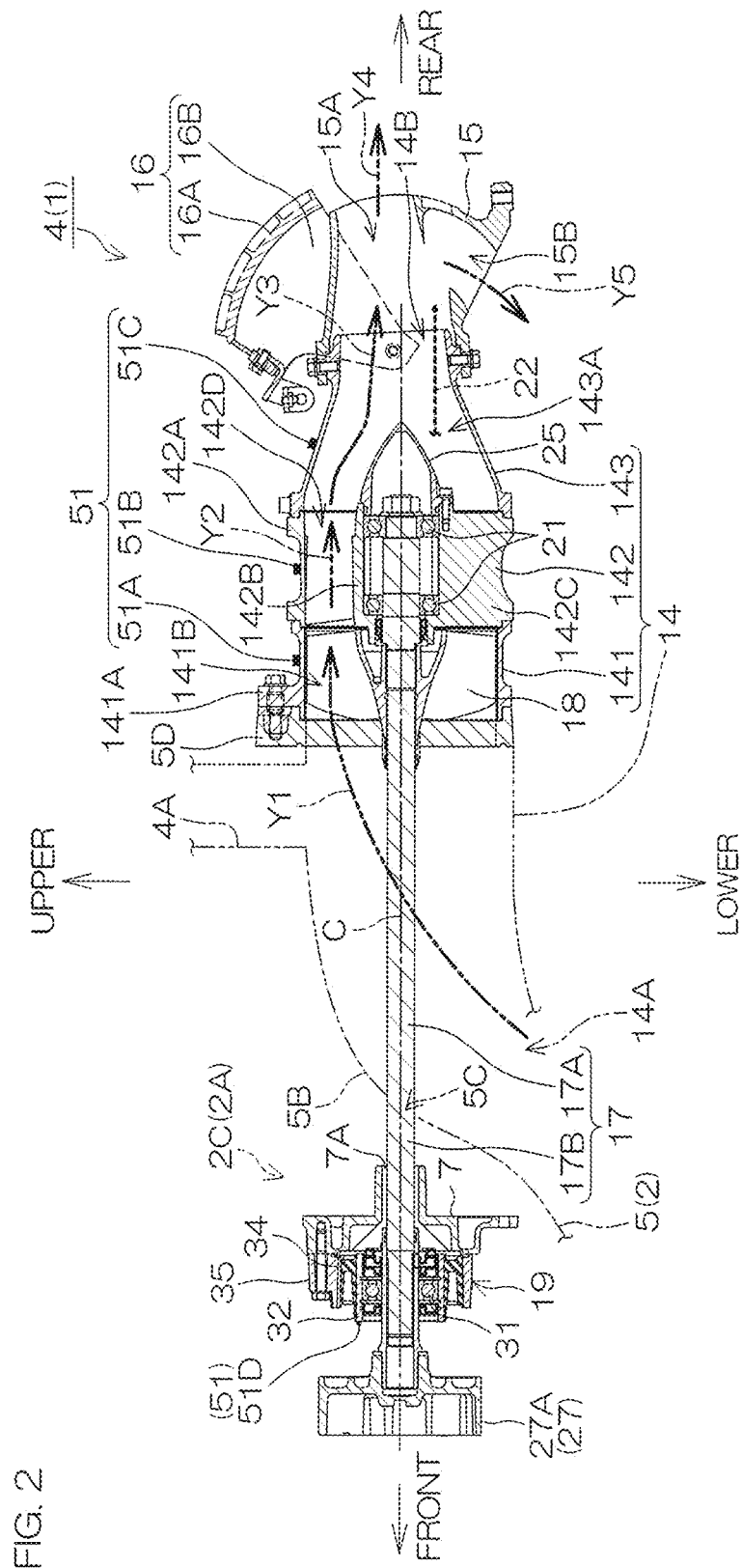
FIG. 2 is a vertical side cross-sectional view of a jet pump included in the jet propulsion watercraft.

FIG. 2 is a vertical left side cross-sectional view of the jet pump 4. The flow path 14 and its interior are located in a space different from the internal space 2A of the watercraft body 2. That is, the flow path 14 is a portion of the jet pump 4 outside the watercraft body 2. The through hole 5C provided in the inclined wall 5B of the hull 5 of the watercraft body 2 faces inside the flow path 14 from the front. A water suction port 14A opened downward to suck in water around the watercraft body 2 is provided in a front end portion of the flow path 14. An ejection port 14B opened rearward is provided in a rear end portion of the flow path 14. The flow path 14 guides water sucked in through the water suction port 14A into the flow path 14 to the ejection port 14B.

A portion of the flow path 14 posterior to the water suction port 14A includes a cylindrical impeller housing 141, a cylindrical duct 142 located at the rear of the impeller housing 141, and a cylindrical nozzle 143 located at the rear of the cylindrical duct 142.

Figure 3:
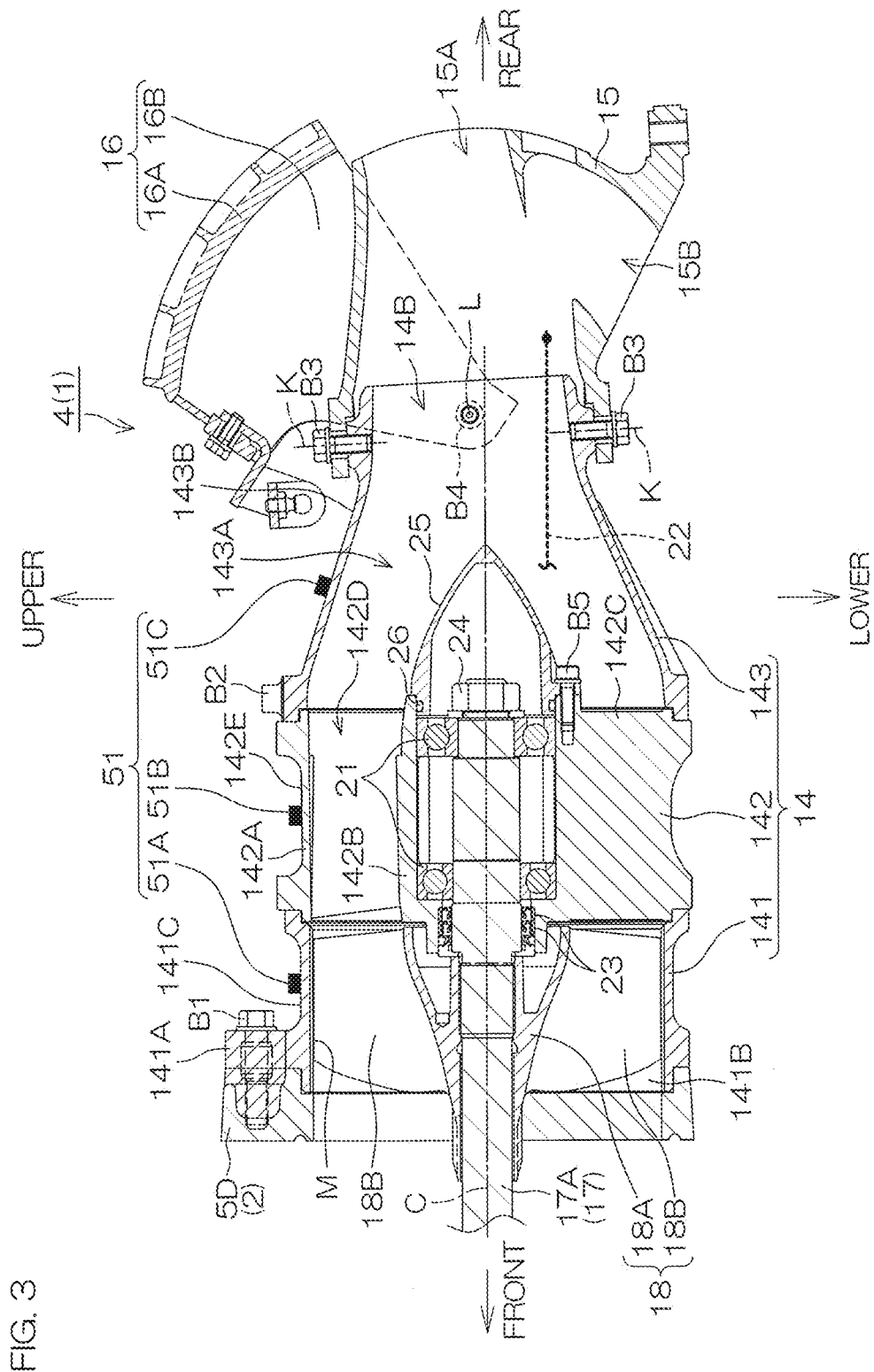
FIG. 3 is an enlarged view of a main portion in FIG. 2.

FIG. 3 is an enlarged view of a main portion around the flow path 14 in FIG. 2. The impeller housing 141 has a cylindrical shape extending in the front-rear direction. A flange 141A flaring radially outward is provided at a front end portion of the impeller housing 141. The flange 141A opposes the transom 5D of the hull 5 from the rear. A fastener B1 penetrates the flange 141A to be assembled to the transom 5D, so that the entire flow path 14 including the impeller housing 141 is fixed to the watercraft body 2. A bolt, for example, may be used as the fastener B1. The same applies to other fasteners to be described below.

The duct 142 includes an outer cylinder 142A extending in the front-rear direction, an inner cylinder 142B surrounded coaxially by the outer cylinder 142A, and a single or a plurality of stator vanes 142C located within the duct 142. A fastener (not shown) is assembled to a front end portion of the outer cylinder 142A and a rear end portion of the impeller housing 141, so that the duct 142 is fixed to the impeller housing 141. In this state, the duct 142 is located outside and farther rearward from the watercraft body 2 than the impeller housing 141. The impeller housing 141 and the duct 142 may be separate components as in this preferred embodiment or may be integral. The inside diameter of the outer cylinder 142A is equal to or substantially equal to the inside diameter of the impeller housing 141. The outside diameter of the outer cylinder 142A is equal to or substantially equal to the outside diameter of the impeller housing 141.

A single or a plurality of outer bearings 21 are located within the inner cylinder 142B. As an example, the outer bearing 21 is a ball bearing, and two such outer bearings 21 are located coaxially within the inner cylinder 142B and aligned in the front-rear direction. The outer ring of the outer bearing 21 is fitted to the inner peripheral surface of the inner cylinder 142B, so that the outer bearing 21 is supported on the inner cylinder 142B, that is, the duct 142.

The stator vane 142C bridges between the inner peripheral surface of the outer cylinder 142A and the outer peripheral surface of the inner cylinder 142B. If multiple stator vanes 142C are provided, the stator vanes 142C extend radially from the outer peripheral surface of the inner cylinder 142B to be connected to the inner peripheral surface of the outer cylinder 142A. The region other than the stator vane 142C between the inner peripheral surface of the outer cylinder 142A and the outer peripheral surface of the inner cylinder 142B is an internal flow path 142D opened in both the front and rear directions within the duct 142. The internal flow path 142D communicates with the internal space 141B of the impeller housing 141 from the rear.

The nozzle 143 has a cylindrical shape with the diameter reduced rearward. A fastener B2 penetrates a front end portion of the nozzle 143 to be assembled to the outer cylinder 142A of the duct 142, so that the nozzle 143 is fixed to the duct 142. In this state, the nozzle 143 is located outside and farther rearward from the watercraft body 2 than the duct 142. The inside diameter of the front end portion of the nozzle 143 is equal to or substantially equal to the inside diameter of the outer cylinder 142A. The outside diameter of the front end portion of the nozzle 143 is equal to or substantially equal to the outside diameter of the outer cylinder 142A. The internal space 143A of the nozzle 143 communicates with the internal flow path 142D of the duct 142 from the rear. An opening which is provided in a rear end portion of the nozzle 143 and through which the internal space 143A is opened rearward corresponds to the above-mentioned ejection port 14B.

The deflector 15 has a cylindrical shape extending in the front-rear direction. The deflector 15 includes a first ejection port 15A opened rearward and a second ejection port 15B opened forward and downward. The rear end portion of the nozzle 143 is located within the deflector 15, and the ejection port 14B opposes the first ejection port 15A from the front. The deflector 15 is coupled to the nozzle 143 using a pair of upper and lower fasteners B3. The deflector 15 is rotatable in the left-right direction about an imaginary turning axis K extending in the vertical direction.

The deflector 15 and the above-mentioned steering handle 9 are connected through a steering cable 22. A rear end portion of the steering cable 22 is fixed to the outer surface of the deflector 15. When the occupant operates the steering handle 9, the operating force is transmitted through the steering cable 22 to turn the deflector 15. As another example, the jet propulsion watercraft 1 may include a steering position sensor (not shown) arranged to detect the position of the steering handle 9 and an electric actuator (not shown) to turn the deflector 15 based on a detection value from the steering position sensor.

The reverse gate 16 includes a body portion 16A extending in the left-right direction and a pair of coupling portions 16B extending forward from both end portions of the body portion 16A in the left-right direction. The pair of coupling portions 16B sandwich the deflector 15 from both sides in the left-right direction. A fastener B4 couples each of the pair of coupling portions 16B to the deflector 15. In this state, the reverse gate 16 is rotatable in the vertical direction about an imaginary turning axis L extending in the left-right direction.

The reverse gate 16 shown in FIG. 3 is at a standby position where the body portion 16A is located away and upward from the first ejection port 15A of the deflector 15. The reverse gate 16 is rotatable downward to a reverse position (not shown) where the body portion 16A opposes the first ejection port 15A from the rear.

The drive shaft 17 extends in the front-rear direction in its entirety. The drive shaft 17 includes an outer shaft 17A located outside the watercraft body 2 as a rear portion of the drive shaft 17 and an inner shaft 17B located inside the watercraft body 2 as a front portion of the drive shaft 17 (see FIG. 2). The outer shaft 17A and the inner shaft 17B are coaxial.

The drive shaft 17 receives a drive force from the drive source 3 to rotate about a rotation axis C that coincides with the central axis of the drive shaft 17 and, when this occurs, the outer shaft 17A and the inner shaft 17B rotate integrally about the rotation axis C. The outer shaft 17A and the inner shaft 17B may be integral or may be separate components coupled in an integrally rotatable manner.

The outer shaft 17A is located within the flow path 14. A rear end portion of the outer shaft 17A is coaxial within the inner cylinder 142B of the duct 142 and supported on the outer bearing 21 in a manner rotatable about the rotation axis C of the drive shaft 17.

The gap between a portion anterior to the outer bearing 21 positioned most forward in the rear end portion of the outer shaft 17A and a front end portion of the inner cylinder 142B is sealed with a single or a plurality of seals 23. The seal 23 has an annular body and may be an oil seal or an O-ring. The same applies to other seals to be described below.

A nut 24 is assembled to a portion posterior to the outer bearing 21 at the rear end portion of the outer shaft 17A. A conical cap 25 with the diameter reduced rearward is fixed, with a fastener B5, to a rear end portion of the inner cylinder 142B. The cap 25 is located in the internal space 143A of the nozzle 143. The nut 24 is located within the cap 25. A front end portion of the cap 25 is fitted within the rear end portion of the inner cylinder 142B, and the gap between the front end portion of the cap 25 and the rear end portion of the inner cylinder 142B is sealed with a seal 26. The seal 23 and the seal 26 prevent the outer bearing 21 from exposure to water.

The impeller 18 is mounted to a portion located anterior to the seal 23 positioned most forward on the outer shaft 17A and within the impeller housing 141. The impeller 18 includes a central portion 18A coupled integrally and rotatably to the outer shaft 17A via, for example, a spline and a plurality of blades 18B extending radially from the central portion 18A, and is housed within the impeller housing 141. A small gap M is demarcated between the leading end of each of the blades 18B and the inner peripheral surface of the impeller housing 141. Therefore, the impeller 18 rotates integrally with the outer shaft 17A without coming into contact with the inner peripheral surface of the impeller housing 141.

The inner shaft 17B extends through the through hole 5C in the hull 5 to be located in the rear region 2C of the internal space 2A of the watercraft body 2 and inserted through the insertion hole 7A in the partition wall 7 to be coupled through a joint 27 to the crankshaft 3A of the drive source 3 (see FIG. 2).

Figure 4:
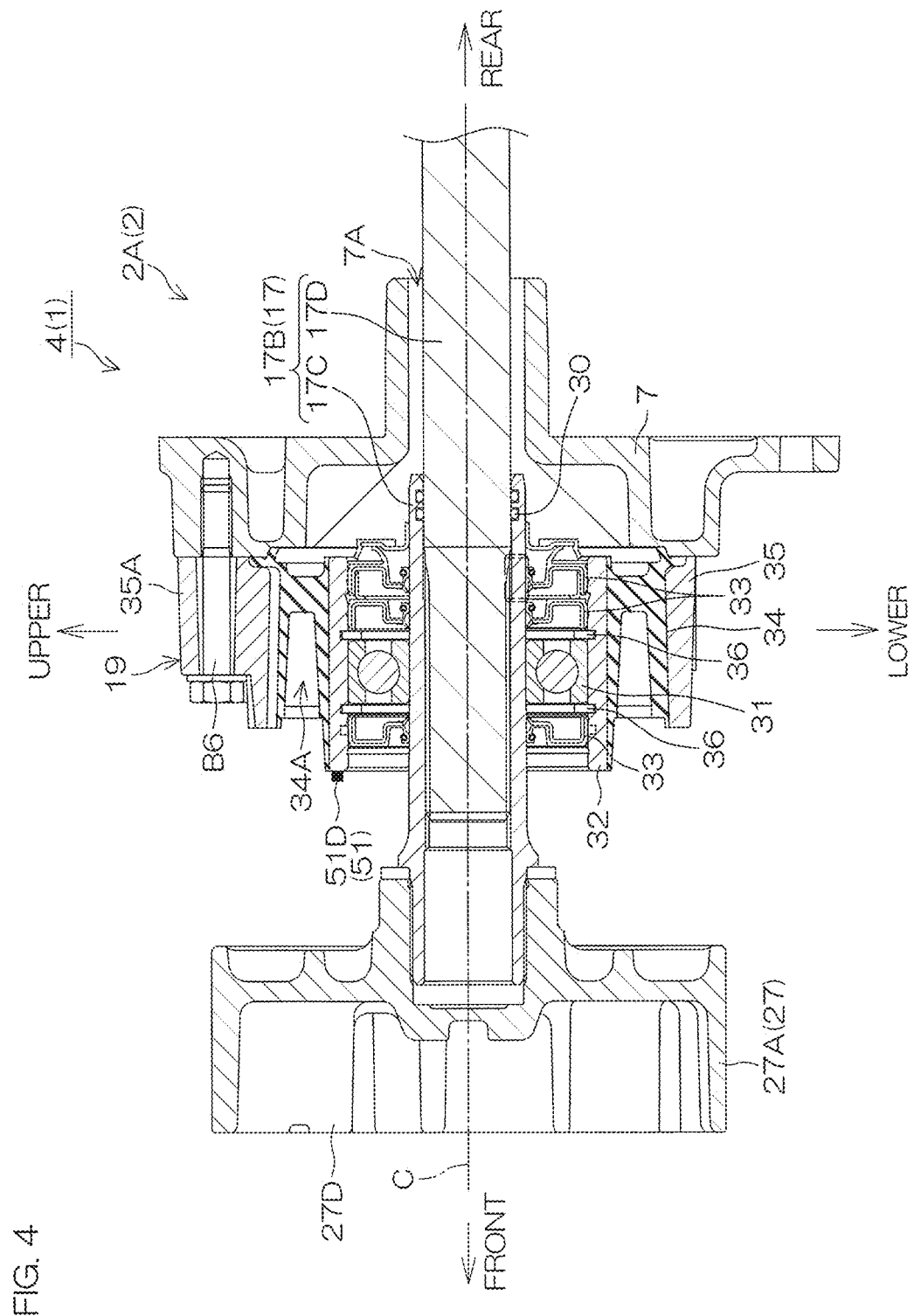
FIG. 4 is an enlarged view of a main portion in FIG. 2.

FIG. 4 is an enlarged view of a main portion around the inner shaft 17B in FIG. 2. The inner shaft 17B includes a first shaft 17C and a second shaft 17D. The first shaft 17C has a circular tubular shape extending in the front-rear direction. The second shaft 17D has a solid circular columnar shape extending in the front-rear direction and inserted through the hollow portion of the first shaft 17C from the rear. The first shaft 17C and the second shaft 17D are spline coupled to each other and integrally rotatable. The gap between a rear end portion of the inner peripheral surface of the first shaft 17C and the outer peripheral surface of the second shaft 17D is sealed with a seal 30.

The above-mentioned joint 27 includes a first joint 27A fixed to a front end portion of the first shaft 17C, a second joint 27B fixed to a rear end portion of the crankshaft 3A of the drive source 3 (see FIG. 1), and a damper 27C located between the first joint 27A and the second joint 27B (see FIG. 1). The first joint 27A and the second joint 27B each have a gear shape to engage each other. The damper 27C is made of an elastic material such as rubber and has a gear shape. The multiple teeth (not shown) of the damper 27C are located one-by-one between the teeth 27D of the first joint 27A and the teeth (not shown) of the second joint 27B. The impact occurring during power transmission between the first joint 27A and the second joint 27B is absorbed by elastic deformation of the damper 27C.

The housing bearing 19 includes an inner bearing 31 rotatably supporting the inner shaft 17B, a holder 32 supporting the inner bearing 31, and a seal 33 located within the holder 32. The housing bearing 19 also includes a damper 34 elastically supporting the holder 32 and a housing 35 supporting the damper 34 and fixed to the partition wall 7.

The inner bearing 31 is, for example, a ball bearing and surrounds a portion of the outer peripheral surface of the first shaft 17C posterior to the first joint 27A. The holder 32 is a cylinder coaxial with the drive shaft 17 and surrounds the inner bearing 31. The inner bearing 31 is fitted between the outer peripheral surface of the first shaft 17C and the inner peripheral surface of the holder 32. A pair of front and rear positioning portions 36 each including, for example, a washer are provided in the inner peripheral surface of the holder 32. The positioning portions 36 sandwich the outer ring of the inner bearing 31, so that the inner bearing 31 is positioned in the front-rear direction with respect to the holder 32.

A single or a plurality of seals 33 are provided, respectively, anterior and posterior to the pair of front and rear positioning portions 36. The seals 33 seal the gap between the outer peripheral surface of the first shaft 17C and the inner peripheral surface of the holder 32. This prevents the inner bearing 31 between the positioning portions 36 from exposure to water.

The damper 34 is a cylinder coaxial with the drive shaft 17 and made of an elastic material such as rubber. The damper 34 may include a single or a plurality of punching holes 34A extending rearward from its front end face. The damper 34 surrounds the holder 32. The inner peripheral surface of the damper 34 is in contact with the outer peripheral surface of the holder 32. The damper 34 is fixed, for example, by adhesive to the holder 32.

The housing 35 is a cylinder coaxial with the drive shaft 17. The housing 35 surrounds the damper 34, and the inner peripheral surface of the housing 35 is in contact with the outer peripheral surface of the damper 34. The housing 35 is fixed, for example, by adhesive to the damper 34. A flange 35A flaring radially outward is provided in the housing 35. The flange 35A opposes the partition wall 7 from the front.

A fastener B6 penetrates the housing 35A to be assembled to the partition wall 7, so that the entire housing bearing 19 including the housing 35 is fixed to the watercraft body 2.

Figure 5:
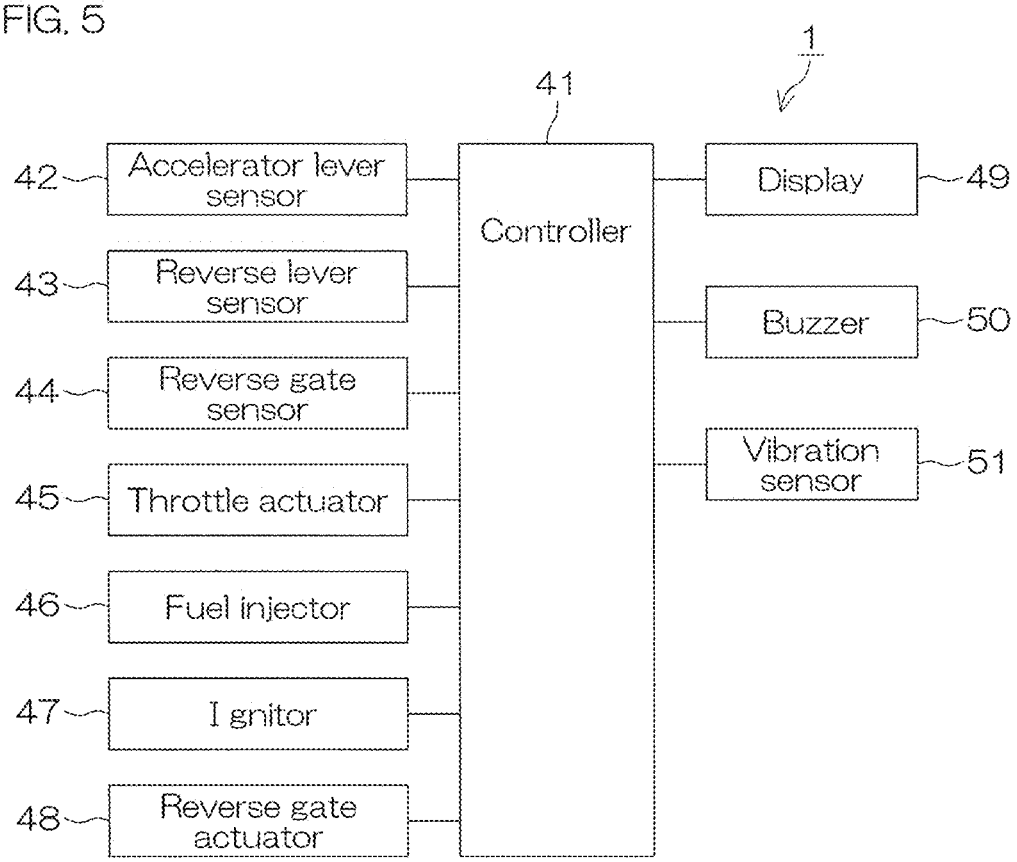
FIG. 5 is a block diagram showing an electrical configuration of the jet propulsion watercraft.

FIG. 5 is a block diagram showing an electrical configuration of the jet propulsion watercraft 1. The jet propulsion watercraft 1 further includes a controller 41 including, for example, a microcomputer including a CPU (central processing unit) and a memory. The jet propulsion watercraft 1 further includes an accelerator lever sensor 42, a reverse lever sensor 43, a reverse gate sensor 44, a throttle actuator 45, a fuel injector 46, and an ignitor 47 connected electrically to the controller 41. The jet propulsion watercraft 1 further includes a reverse gate actuator 48, a display 49, a buzzer 50, and a vibration sensor 51 connected electrically to the controller 41.

The controller 41 is a so-called ECU (electronic control unit), and executes predetermined software. The accelerator lever sensor 42 detects operation of the accelerator lever 10 by the occupant. The reverse lever sensor 43 detects operation of the reverse lever 11 by the occupant. The reverse gate sensor 44 detects the position of the reverse gate 16. The accelerator lever sensor 42, the reverse lever sensor 43, and the reverse gate sensor 44 may each include a potentiometer.

The throttle actuator 45, the fuel injector 46, and the ignitor 47 are electrical components associated with the drive source 3 when the drive source 3 is an engine. The throttle actuator 45 changes the throttle opening degree of the engine. The fuel injector 46 injects fuel into the combustion chamber of the engine. The ignitor 47 ignites a mixture of fuel and air within the combustion chamber of the engine. The controller 41 is configured or programmed to control the throttle actuator 45, the fuel injector 46, and the ignitor 47 based on, for example, a detection result from the accelerator lever sensor 42 to adjust the drive force from the drive source 3.

The reverse gate actuator 48 may be an electric actuator to turn the reverse gate 16 between the standby position and the reverse position. The controller 41 is configured or programmed to adjust the position of the reverse gate 16 by the reverse gate actuator 48 based on a detection result from the reverse lever sensor 43. The controller 41 is also configured or programmed to monitor the position of the reverse gate 16 based on a detection result from the reverse gate sensor 44. It is noted that the reverse lever 11 and the reverse gate 16 may be connected through a cable (not shown) and the reverse gate 16 may be turned with an operating force on the reverse lever 11 by the occupant. In this case, the reverse gate actuator 48 may not be provided.

The display 49 includes, for example, a liquid-crystal panel and is located within the sight of the occupant in the jet propulsion watercraft 1 (see FIG. 1). The buzzer 50 may be located close to the display 49.

The vibration sensor 51 is located in the jet pump 4 to detect vibration of the jet pump 4. The vibration sensor 51 may use, for example, a vibration pick-up or an acceleration sensor. The detection result from the vibration sensor 51 is a vibration frequency (i.e., frequency) in this preferred embodiment, but may be, for example, acceleration. The vibration sensor 51 is fixed to the jet pump 4 using a fastener and/or adhesive. As indicated by the dark filled-in areas in FIGS. 2 to 4, the vibration sensor 51 is provided on at least one of the flow path 14 and the housing bearing 19 in the jet pump 4.

The vibration sensor 51, when provided on the flow path 14, is provided on at least one of the outer peripheral surface 141C of the impeller housing 141, the outer peripheral surface 142E of the duct 142, and the outer peripheral surface 143B of the nozzle 143, as shown in FIG. 3. It is noted that the number of vibration sensors 51 provided on each of the impeller housing 141, the duct 142, and the nozzle 143 may be set arbitrarily.

The vibration sensor 51, when provided on the housing bearing 19, is provided on the holder 32 supporting the inner bearing 31, as shown in FIG. 4. The holder 32 is an example of a portion of the housing bearing 19 closer to the inner bearing 31 than the damper 34. The vibration sensor 51 may be provided directly on the inner bearing 31.

With reference to FIG. 2, when a drive force from the drive source 3 is transmitted through the crankshaft 3A to the drive shaft 17 in response to an operation of the accelerator lever 10 by the occupant, the impeller 18 is driven to rotate together with the drive shaft 17. Water around the watercraft body 2 is then sucked in by the rotating impeller 18 through the water suction port 14A into the flow path 14 to flow rearward and received within the impeller housing 141, that is, by the internal space 141B (see arrow Y1). The water flowing through the impeller housing 141 is then received within the duct 142, that is, by the internal flow path 142D (see arrow Y2). The water passes through the stator vane 142C within the duct 142, so that the water flow is regulated with a reduction in twisting caused by the rotation of the impeller 18.

The water thus regulated by the stator vane 142C flows through the duct 142 to be then guided into the internal space 143A of the nozzle 143 and then ejected rearward through the ejection port 14B at the rear end of the nozzle 143 (see arrow Y3). The water ejected rearward through the interior of the ejection port 14B flows rearward through the deflector 15. At this time, when the reverse gate 16 is at the standby position (see FIGS. 2 and 3), the water within the deflector 15 is ejected rearward through the first ejection port 15A (see arrow Y4), so that a propulsive force in the forward drive direction is generated. In this state, when the occupant operates the steering handle 9, the deflector 15 and the reverse gate 16 are turned integrally in the left-right direction and the propulsive force is redirected in the left-right direction, so that the jet propulsion watercraft 1 turns left or right. On the other hand, when the reverse gate 16 is at the reverse position, the water within the deflector 15 is ejected forward and downward through the second ejection port 15B (see arrow Y5), so that a propulsive force in the reverse drive direction is generated.

In such a state where the propulsive force is generated, the controller 41 determines whether or not a detection result from the vibration sensor 51 meets a predetermined condition. As an example, when the vibration frequency of the jet pump 4 detected by the vibration sensor 51 remains equal to or higher than a predetermined value for a predetermined time, the controller 41 determines that the detection result from the vibration sensor 51 meets the predetermined condition. An example of the predetermined value is an indicator that is used to estimate that the jet pump 4 has a problem that needs to be improved, and is defined for each problem through, for example, experiments and stored in the memory of the controller 41.

With reference to FIG. 3, when the vibration frequency detected by the vibration sensor 51A, which is a vibration sensor 51 provided on the impeller housing 141, remains equal to or higher than a predetermined value for a predetermined time, there may be foreign matter in the gap M between the impeller 18 and the impeller housing 141. Alternatively, the impeller 18 may undergo wear and/or malfunction. The controller 41 is able to determine whether or not there is foreign matter in the gap M between the impeller 18 and impeller housing 141 in the jet pump 4 based on the detection result from the vibration sensor 51A.

It is noted that multiple vibration sensors 51A may be provided and the controller 41 may determine whether or not there is foreign matter in the gap M based on an average of vibration frequencies detected by the vibration sensors 51A. The arrangement in which the average of detection results from the multiple vibration sensors 51 is used for the determination can also be applied to other vibration sensors 51B to 51D to be described below.

When the vibration frequency detected by the vibration sensor 51B, which is a vibration sensor 51 provided on the duct 142, remains equal to or higher than a predetermined value for a predetermined time, there may be, for example, foreign matter and/or corrosion in the outer bearing 21 supported on the duct 142. The controller 41 is able to determine the condition of, for example, the outer bearing 21 based on a detection result from the vibration sensor 51B.

When the vibration frequency detected by the vibration sensor 51C, which is a vibration sensor 51 provided on the nozzle 143, remains equal to or higher than a predetermined value for a predetermined time, there may be, for example, foreign matter within the nozzle 143, that is, the internal space 143A. The controller 41 is able to determine whether or not there is, for example, foreign matter within the nozzle 143 based on a detection result from the vibration sensor 51C. Also, the nozzle 143 is located farther from the transom 5D of the watercraft body 2 (a fixed point in the jet propulsion watercraft 1) than the impeller housing 141 and the duct 142 in the jet pump 4, and thus may undergo relatively large vibration. Therefore, the vibration sensor 51C is able to accurately detect vibration of the entire jet pump 4, in particular, vibration of a frequency that can cause malfunction in the steering cable 22 (see FIG. 3).

With reference to FIG. 4, when the vibration frequency detected by the vibration sensor 51D, which is a vibration sensor 51 provided on the inner bearing 31 or the holder 32, remains equal to or higher than a predetermined value for a predetermined time, the inner shaft 17B may undergo wear and/or decentering. Wear of the inner shaft 17B is, for example, spline wear between the first shaft 17C and the second shaft 17D. Also, when the vibration frequency detected by the vibration sensor 51D remains equal to or higher than a predetermined value for a predetermined time, the inner bearing 31 may undergo corrosion. The controller 41 is able to determine the condition of, for example, the inner shaft 17B and/or the inner bearing 31 based on a detection result from the vibration sensor 51D.

In the jet propulsion watercraft 1, the controller 41 thus determines whether or not the detection result from the vibration sensor 51 provided on the jet pump 4 meets the predetermined condition to determine the condition of the jet pump 4. That is, even without using, for example, an external diagnosis support system to analyze information indicating the operating condition of the drive source 3, the jet propulsion watercraft 1 itself is able to determine the condition of the jet pump 4 based on vibration of the jet pump 4 itself, which is a detection result from the vibration sensor 51. This reduces the time and effort required to determine the condition of the jet pump 4. Also, in this case, even without using information on the operating condition of the drive source 3 (such as engine rotation speed), it is possible to accurately determine the condition of the jet pump 4 based on vibration of the jet pump 4.

The controller 41, when it is determined that the detection result from the vibration sensor 51 meets the predetermined condition, that is, when the jet pump 4 is in a predetermined condition, informs the user of user-oriented information. The user-oriented information includes warnings, information on the condition of the jet pump 4, and information on the action to be taken by the user. The controller 41 may display and inform a user of the user-oriented information on the display 49 or may sound the buzzer 50 to inform a user of the user-oriented information. The user receiving the information can take an appropriate action to, for example, change the condition of the jet pump 4. For such action, the user may maintain the jet pump 4 himself/herself or may take the jet propulsion watercraft 1 to a dealer.

The controller 41, when it is determined that the detection result from the vibration sensor 51 meets the predetermined condition, for example, when the jet pump 4 is in a condition that needs to be improved, may limit the output of the drive source 3. To do so, the controller 41 may limit the rotation speed of the drive source 3. As an example of limiting the rotation speed of the drive source 3, the controller 41 may stop the drive source 3. The output of the drive source 3 is thus limited and thus the load on the jet pump 4 is reduced, so that it is possible to reduce deterioration in the condition of the jet pump 4.

While preferred embodiments of the present invention have heretofore been described, the present invention may also be embodied in other ways.

For example, the jet propulsion watercraft 1 may include a plurality jet pumps 4. The jet propulsion watercraft 1 is not limited to such a personal watercraft as mentioned above (see FIG. 1), but may be a sport boat with a cabin. In the case of a sport boat, the jet pump 4 may be provided with an inspection port 4A for the user in the cabin to gain access into the flow path 14 (see FIG. 2). The user, when informed by the display 49 or the buzzer 50, is able to gain access into the flow path 14 through the inspection port 4A for maintenance to remove foreign matter within the flow path 14.

The above-described various features may be combined as appropriate.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A jet propulsion watercraft comprising:
    a watercraft body;
    a drive source in the watercraft body;
    a jet pump to suck in and eject water with a drive force from the drive source to generate a propulsive force;
    a vibration sensor in the jet pump to detect vibration of the jet pump; and
    a controller configured or programmed to determine whether or not a detection result from the vibration sensor meets a predetermined condition and, when it is determined that the detection result from the vibration sensor meets the predetermined condition, inform a user of user-oriented information; wherein
    the controller is configured or programmed to, when it is determined that the detection result from the vibration sensor meets the predetermined condition, stop the drive source.

2. The jet propulsion watercraft according to claim 1, further comprising:
    a display; wherein
    the controller is configured or programmed to, when it is determined that the detection result from the vibration sensor meets the predetermined condition, display and inform the user of the user-oriented information on the display.

3. The jet propulsion watercraft according to claim 1, further comprising:
    a buzzer; wherein
    the controller is configured or programmed to, when it is determined that the detection result from the vibration sensor meets the predetermined condition, sound the buzzer to inform the user of the user-oriented information.

4. The jet propulsion watercraft according to claim 1, wherein the controller is configured or programmed to, when a vibration frequency of the jet pump detected by the vibration sensor remains equal to or higher than a predetermined value for a predetermined time, determine that the detection result from the vibration sensor meets the predetermined condition.

5. A jet propulsion watercraft comprising:
    a watercraft body;
    a drive source in the watercraft body;
    a jet pump to suck in and eject water with a drive force from the drive source to generate a propulsive force;
    a vibration sensor in the jet pump to detect vibration of the jet pump; and
    a controller configured or programmed to determine whether or not a detection result from the vibration sensor meets a predetermined condition and, when it is determined that the detection result from the vibration sensor meets the predetermined condition, inform a user of user-oriented information; wherein
    the vibration sensor is in a portion of the jet pump outside of the watercraft body.

6. The jet propulsion watercraft according to claim 5, wherein the jet pump includes:
    a drive shaft including an inner shaft inside the watercraft body and an outer shaft outside the watercraft body to rotate integrally with the inner shaft, the drive shaft being operable to rotate when the drive force from the drive source is transmitted to the drive shaft;
    an impeller mounted on the outer shaft to rotate integrally with the outer shaft; and
    an impeller housing fixed on an outer side of the watercraft body to house the impeller and to receive water sucked in when the impeller rotates; wherein
    the vibration sensor is on the impeller housing.

7. The jet propulsion watercraft according to claim 5, wherein the jet pump includes:
    a drive shaft including an inner shaft inside the watercraft body and an outer shaft outside the watercraft body to rotate integrally with the inner shaft, the drive shaft being operable to rotate when the drive force from the drive source is transmitted to the drive shaft;
    an impeller mounted on the outer shaft to rotate integrally with the outer shaft;
    an impeller housing fixed on an outer side of the watercraft body to house the impeller and to receive water sucked in when the impeller rotates;
    an outer bearing supporting the outer shaft;
    a duct outside of and farther from the watercraft body than the impeller housing to support the outer bearing, the duct being positioned to receive water flowing through the impeller housing; and
    a stator vane in the duct to regulate the flow of water within the duct; wherein
    the vibration sensor is on the duct.

8. The jet propulsion watercraft according to claim 5, wherein the jet pump includes:
- a drive shaft including an inner shaft inside the watercraft body and an outer shaft outside the watercraft body to rotate integrally with the inner shaft, the drive shaft being operable to rotate when the drive force from the drive source is transmitted to the drive shaft;
- an impeller mounted on the outer shaft to rotate integrally with the outer shaft;
- an impeller housing fixed on an outer side of the watercraft body to house the impeller and to receive water sucked in when the impeller rotates;
- an outer bearing supporting the outer shaft;
- a duct outside of and farther from the watercraft body than the impeller housing to support the outer bearing, the duct being operable to receive water flowing through the impeller housing;
- a stator vane in the duct to regulate the flow of water within the duct; and
- a nozzle outside of and farther from the watercraft body than the duct and including an ejection port, the nozzle being operable to eject water flowing through the duct from the ejection port; wherein the vibration sensor is on the nozzle.

9. A jet propulsion watercraft comprising:
a watercraft body:
a drive source in the watercraft body;
a jet pump to suck in and eject water with a drive force from the drive source to generate a propulsive force;
a vibration sensor in the jet pump to detect vibration of the jet pump; and
a controller configured or programmed to determine whether or not a detection result from the vibration sensor meets a predetermined condition and, when it is determined that the detection result from the vibration sensor meets the predetermined condition, inform a user of user-oriented information; wherein
the vibration sensor is in a portion of the jet pump inside the watercraft body;
the jet pump includes:
- a drive shaft including an inner shaft inside the watercraft body and an outer shaft outside the watercraft body to rotate integrally with the inner shaft, the drive shaft being operable to rotate when the drive force from the drive source is transmitted to the drive shaft; and
- a housing bearing inside the watercraft body and including an inner bearing supporting the inner shaft, a holder supporting the inner bearing, and a damper elastically supporting the holder; and the vibration sensor is on the inner bearing or the holder.

* * * * *